(12) United States Patent
Shaharabani et al.

(10) Patent No.: US 11,420,570 B2
(45) Date of Patent: Aug. 23, 2022

(54) WIRELESS CAMERA MOUNTING SYSTEM

(71) Applicant: Adasky, Ltd., Yokneam Illit (IL)

(72) Inventors: Yakov Shaharabani, Kidron (IL); Amotz Katz, Habonim (IL); Vitaly Kuperman, Maalot (IL)

(73) Assignee: Adasky, Ltd., Yokneam Illit (IL)

( * ) Notice: Subject to any disclaimer, the term of this patent is extended or adjusted under 35 U.S.C. 154(b) by 0 days.

(21) Appl. No.: 16/843,629

(22) Filed: Apr. 8, 2020

(65) Prior Publication Data

US 2020/0317141 A1 Oct. 8, 2020

Related U.S. Application Data

(60) Provisional application No. 62/830,875, filed on Apr. 8, 2019.

(51) Int. Cl.
| | |
|---|---|
| *H04N 7/18* | (2006.01) |
| *B60R 11/04* | (2006.01) |
| *H04N 5/225* | (2006.01) |
| *G06T 7/00* | (2017.01) |
| *B62D 15/02* | (2006.01) |
| *B60Q 9/00* | (2006.01) |
| *B60R 11/00* | (2006.01) |

(52) U.S. Cl.
CPC ............... *B60R 11/04* (2013.01); *B60Q 9/00* (2013.01); *B62D 15/025* (2013.01); *G06T 7/00* (2013.01); *H04N 5/2253* (2013.01); *B60R 2011/004* (2013.01); *G06T 2207/10048* (2013.01); *G06T 2207/30252* (2013.01)

(58) Field of Classification Search
CPC ..... B60R 11/04; B60R 2300/406; B60R 1/00; B60R 2011/004; H04N 5/2253; G06T 7/00; G06T 2207/10048; G06T 2207/30252; B62D 15/025; B60Q 9/00; B60W 50/0225; B60W 30/12; B60W 2420/62; B60W 10/00; B60W 50/02; G05D 1/0891; G05D 2201/0213; G06V 20/588; G01S 7/4972
USPC ........................................................ 348/148
See application file for complete search history.

(56) References Cited

U.S. PATENT DOCUMENTS

| | | | | |
|---|---|---|---|---|
| 5,552,780 | A * | 9/1996 | Knockeart | G08C 23/04 340/531 |
| 9,893,538 | B1 * | 2/2018 | Bell | H04N 7/18 |
| 10,203,699 | B1 * | 2/2019 | Kim | G08G 1/096811 |
| 10,445,595 | B2 * | 10/2019 | Stein | G06T 7/74 |
| 10,708,547 | B2 * | 7/2020 | Newman | G08G 1/0129 |
| 2008/0203308 | A1 * | 8/2008 | Yoo | G01J 1/0252 250/352 |
| 2012/0224060 | A1 * | 9/2012 | Gurevich | B60R 1/00 348/148 |

(Continued)

FOREIGN PATENT DOCUMENTS

CN 107021017 A 8/2017

*Primary Examiner* — Gims S Philippe
(74) *Attorney, Agent, or Firm* — M&B IP Analysts, LLC (57) ABSTRACT

A camera mounting system and a method for processing images are disclosed. The system includes an external component configured to capture thermal images, and an internal component configured to receive the thermal images. The thermal images are wirelessly transmitted by the external component, the external component is coupled to the internal component via a glass, and the internal component is further configured to wirelessly power the external component.

20 Claims, 4 Drawing Sheets

(56) References Cited

U.S. PATENT DOCUMENTS

| | | | | |
|---|---|---|---|---|
| 2014/0091123 A1* | 4/2014 | Kim | ............... | B60R 1/04 |
| | | | | 224/567 |
| 2016/0182860 A1 | 6/2016 | Yu | | |
| 2019/0387185 A1* | 12/2019 | Hicks | ............... | H04N 5/33 |

* cited by examiner

WIRELESS CAMERA MOUNTING SYSTEM

CROSS-REFERENCE TO RELATED APPLICATIONS

This application claims the benefit of U.S. Provisional Application No. 62/830,875, filed on Apr. 8, 2019, the contents of which are hereby incorporated by reference.

TECHNICAL FIELD

The present disclosure relates generally to advanced driver assistance systems (ADAS), and in particular to mounting of an automotive camera-based ADAS.

BACKGROUND

As sensor-based technology has improved dramatically in recent years, new uses for sensors have become possible. In particular, cameras have become widely utilized for various applications, including Advanced Driver Assistance Systems (ADAS) and autonomous vehicle systems. One type of camera that may be utilized in these applications is a thermal infrared camera. The infrared spectrum lies outside of the visible light range and consists of a Near Infrared section (NIR), with wavelengths of 0.75-1 micrometers (μm); a Short Wavelength Infrared section (SWIR) with wavelengths of 1-3 μm; a Medium Wavelength Infrared section (MWIR) with wavelengths of 3-5 μm; and a Long Wavelength Infrared section (LWIR) with wavelengths of 8-14 μm. Many thermal Infrared (IR) cameras operate within the LWIR section to detect infrared energy that is guided to an IR sensor through the camera's lens. These IR cameras can be utilized for a variety of imaging applications including, but not limited to, passive motion detection, night vision, thermal mapping, health care, building inspection, surveillance, and the like.

Many camera-based ADAS devices are mounted inside the vehicle on the interior of the windshield in a location that would not obstruct a driver's view, such as behind the rear view mirror or in the corners of the windshield. This allows the camera to capture and analyze a scene ahead while being protected from the elements outside the vehicle via the windshield. An internally mounted camera additionally allows for easier connection between the ADAS device and a vehicle display or an Electronic Control Unit (ECU), or directly to the vehicle network, as physical cables can be directly used to transfer relevant information.

Unfortunately, because the glass of a windshield is opaque to thermal IR radiation, thermal infrared cameras cannot be mounted internally behind the windshield. Therefore, thermal camera-based ADAS systems require an alternative solution, such as mounting the camera module externally. There are a number of challenges to this alternative solution. External mounting exposes the camera to the environment, and makes a direct connection between the camera and any receiving unit inside of the vehicle difficult. Additionally, while a wired connection between all camera elements allows for a more secure and quicker data transfer, it can be more costly and cumbersome to install as an aftermarket addition to a vehicle, as it requires expertise to properly install. Therefore, having a more user friendly configuration that enables a vehicle owner to self-install such a system would be desirable.

It would therefore be advantageous to provide a solution that would overcome the challenges listed above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for processing images. The method includes receiving thermal images captured by a camera included in an external component, analyzing the thermal images, bifurcating thermal images data that have been analyzed into first data components and second data components, transmitting a first plurality of data formed from the first data components via the external component to an internal component, and transmitting a second plurality of data formed from the second data components via the external component to the internal component. The external component is mounted to the internal component through a windshield.

Certain embodiments disclosed herein also include an imager mounting system. The system includes an external component configured to capture thermal images, and an internal component configured to receive the thermal images. The thermal images are wirelessly transmitted by the external component, the external component is coupled to the internal component via a glass, and the internal component is further configured to wirelessly power the external component.

Certain embodiments disclosed herein also include a system for processing images. The system includes a processing circuitry, and a memory. The memory includes instructions that, when executed by the processing circuitry, configure the system to receive thermal images captured by a camera included in an external component, analyze the thermal images, bifurcate the thermal images data that have been analyzed into first data components and second data components, transmit a first plurality of data formed from the first data components via the external component to an internal component, and transmit a second plurality of data formed from the second data components via the external component to the internal component. The external component is mounted to the internal component through a windshield.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
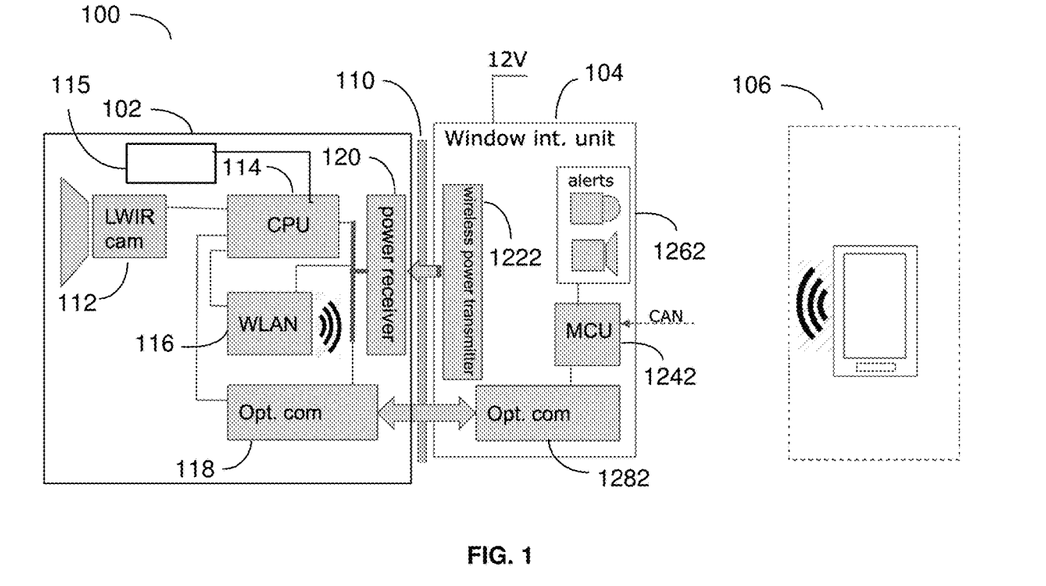
FIG. 1 is a block diagram of a fully wireless Advanced Driver Assistance System (ADAS) mounting system according to an embodiment.

FIG. 1 is an example block diagram of a fully wireless Advanced Driver Assistance System (ADAS) mounting system 100 according to an embodiment. The wireless ADAS mounting system 100 includes an external unit 102 (i.e., a component or a plurality of external components) and an internal unit 104 (i.e., an internal component or a plurality of internal components). In one embodiment, both the external unit 102 and the internal unit 104 are configured to be mounted onto, for example, a windshield 110 of a vehicle directly adjacent to each other. In some embodiment, the mounting may be located on any side window or a back window of a vehicle.

In an embodiment, the external unit 102 includes a processing circuitry 114 connected to an infrared camera 112, (e.g., a Long Wavelength Infrared LWIR camera, or FIR camera), a memory 115 coupled to the processing circuitry 114, an optical transmitter 118, also referred to as a first transmitter, for optical transmission of data, that is, a first plurality of data. In an embodiment, the infrared camera 112 is a shutterless camera.

It should be appreciated that the installation on the windshield the system camera enables integrating LWIR camera adjacent to visible light camera that can complement those features that are missing in LWIR, such as road signs detection and comprehension.

In an embodiment, the external unit 102 further includes a network interface controller 116, including a controller or a transmitter configured to relay data wirelessly, and a wireless power receiver 120 configured to receive power through wireless means. Here, the network interface controller 116 is also referred to as a second transmitter that relays a second plurality of data.

In an embodiment, the processing circuitry 114 includes hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The processing circuitry 114 is configured to execute software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 114 to perform the various processes described herein. The software may be stored in the circuitry 114 or in a separate memory.

The network interface controller 116 provides, in an embodiment, an interface to a wireless communication medium or protocol. For example, the controller 116 may provide an interface to a Wi-Fi, BLE, Zigbee, Wi-Gig, cellular, and the like. In an embodiment, the network interface controller 116 transmits non-critical information over its protocol to a display 106 to be viewed by a user. Non-critical information are those that do not affect the safety of ADAS vehicle operation, even when the network interface controller 116 fails to transmit the information (i.e., the information is lost or dropped during data transmission). In other words, the non-critical information include those that are merely used to display on a display 106 for a user to see, and does not include ADAS commands, alerts, or safety function. An example of such non-critical data is video data.

The internal unit 104 is installed inside the vehicle and includes a matching wireless power transmitter 122, a Microcontroller Unit (MCU) 124, an alert device 126, and a matching optical receiver 128. The wireless power receiver 120 and the wireless power transmitter 122 are configured such that the wireless power provider 122 can be physically connected to power supply (e.g., a 12 volt auxiliary power outlet of a vehicle; not shown), and can provide power to the external unit 102 via the power receiver 120. In an embodiment, the wireless power receiver 120 and transmitter 122 are configured to respectively receive power and transmit data using electromagnetic induction, (e.g., via an induction coil). Thus, power can be provided to the external unit 102 without requiring a physical connection to an external power source.

In an example embodiment, the wireless power transmitter 122 may be configured to transfer energy to the receiver 120 using electromagnetic induction. In this embodiment, the wireless power transmitter 122 uses an induction coil to create an alternating electromagnetic field, which a receiver coil in the power receiver 120 converts back into electricity to power the external unit 120.

In operation, images are captured by the infrared camera 112, analyzed by the processing circuitry 114, and relayed to the internal unit 104 over the network interface controller 116, the optical transmitter 118, or both. The internal unit 104 receives the relayed image and the data associated with the image (e.g., metadata, data created from image analyzed by the processing circuitry 114) and may further analyze the data, (e.g., via the microcontroller unit 124). The received and analyzed data can then be streamed to a display 106, or the results of the analysis may be provided as alerts by the alert device 126. The alerts may be provided visually on the alert device 126 via light warning, or audially via a speaker.

In an embodiment, the display 106 receives the analyzed data from the internal unit 104 over the wireless connection interface established by the interface controller 116. In a further embodiment, the video is wirelessly transmitted to the display 106 directly from the external unit 102. Radio frequency based wireless connections offer significant bandwidth. However, transmitting data over such a connection is often unreliable, as data packets can be lost or dropped. As such, it is undesirable to use such a connection to relay critical information, such as ADAS commands and alerts.

More reliable connections include optical or infrared connections, such as an Infrared Data Association (IrDA) protocol connection. However, while these connections ensure full and secure transmission of data, their available bandwidth is limited. In an embodiment of the current disclosure, transmission from the external unit 102 to the internal unit 104 can be bifurcated into critical components and non-critical components, where the wireless connection can be used for non-critical data, and the optical connection can be used for critical data.

Thus, in an embodiment, the transmitted video signal can be wirelessly streamed to the internal unit 104 to be used merely for display purposes without carrying any safety function. Any safety-related data can be performed locally in the external unit 102 processing circuitry 114, and the resulting metadata or relevant alerts based on the processed images can then be transmitted to the internal unit 104 via a reliable optical communication channel through the windshield glass 110 using the optical transmitter 118 and receiver 128. In an alternative embodiment, the optical transmitter 118 and receiver 128 can establish a Light Fidelity (Li-Fi) connection may be used between the external unit 102 and internal unit 104, which allows for a secure connection with increased bandwidth. In such a configuration, more safety-critical raw data can be transmitted to the internal unit 104 for processing therein.

Figure 2:
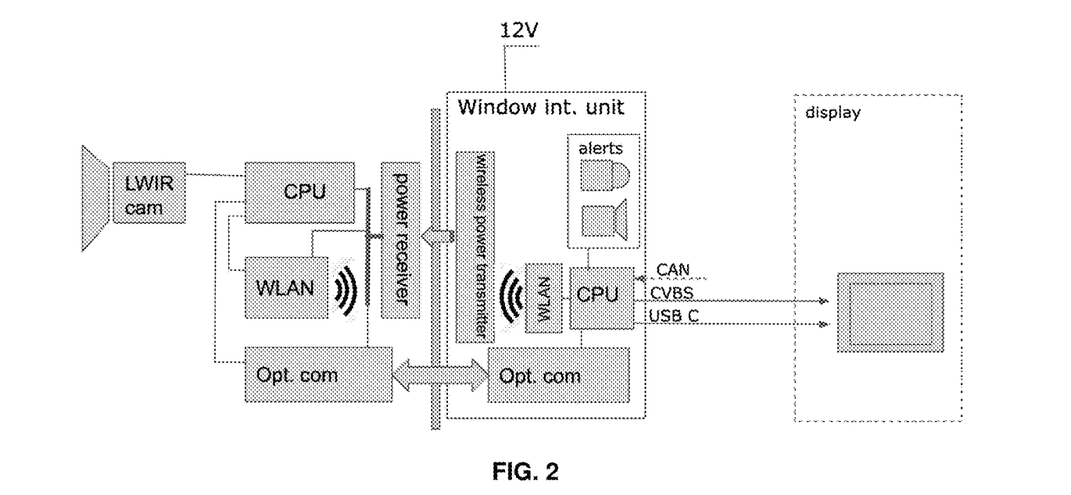
FIG. 2 is a block diagram of a partially wireless ADAS mounting system according to an embodiment.

FIG. 2 is an example block diagram of a partially wireless ADAS mounting system 200 designed according to an embodiment. All of the elements described in FIG. 2 that are common with the embodiment described by FIG. 1 is not repeated herein.

In the example configuration depicted in FIG. 2, a video signal is received wirelessly over a short range directly between the external unit 202 and the internal unit 204, and then transmitted to the display 206 over a wired connection 238, (e.g., a USB cable or ethernet cable connection). Because a short-range wireless transmission is often more reliable, the ADAS algorithm processing can then be performed by a processing circuitry either on the external unit 202, on the internal unit 204, or on both.

In an embodiment, raw data is transmitted from the external unit 202 to the internal unit 206, where a wired connection can then be used to further transfer the data to a secondary processing circuitry, (e.g., an ECU), where additional analysis may be performed. Also, an internal unit 204 may further include a wireless receiver 236 that is connected with the microcontroller for direct communication with the wireless transmitter 216. Here, non-critical video signals may be communicated over the wireless connection. The wireless connection, in the embodiment, may be a Wi-Fi connection or a Wi-Gig connection that relatively provides higher bandwidth.

Figure 3:
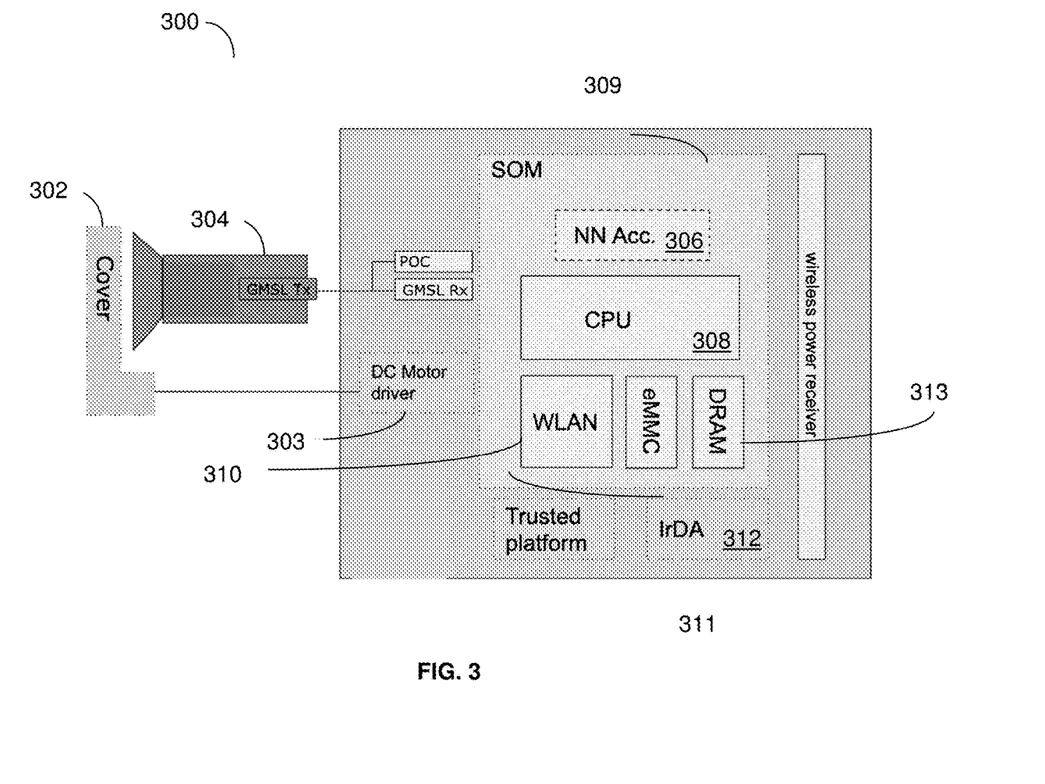
FIG. 3 is a block diagram of an external window unit of the ADAS mounting system according to an external mounting embodiment.

FIG. 3 is an example block diagram of an external unit 300 of the ADAS mounting system according to an external mounting embodiment. The external unit 300 may include a cover 302 configured to protect an infrared camera 304 from harmful external elements such as weather and dirt. The cover 302 may be moved into place to protect the infrared camera 304 by a motor driver 303 located within the external unit, coupled to the cover 302. The cover 302 may be made from infrared-transparent material designed to be resistant to moisture and scratching.

In the example embodiment shown in FIG. 3, the camera 304 is connected to a processing circuitry 308 that may be part of a System on a Module (SOM) 309, which also includes an Embedded MultiMedia Card (eMMC) 311 and a Dynamic Random Access Memory (DRAM) 313 for various data storing needs, and a computer vision accelerator 306 designed to process the video and provide ADAS functionality. A wireless network interface 310 is configured to transmit video and data signals over a wireless signal to receiving devices inside the vehicle (not shown). In an embodiment, the external unit 300 includes an infrared optical transmitter 312, (e.g., a transmitter operating according to the IrDA protocol), for transmitting critical data through the glass of a windshield. In an embodiment, the camera 304 is a LWIR camera (also known as a far-infrared (FIR) camera) that does not include a shutter or any other moving part that blocks the field of view of the camera during operation. Thus, the LWIR camera is a shutter-less camera. In an embodiment, the LWIR camera 304 is optimized to operate or be integrated in advanced driver assistance systems and autonomous vehicles systems. An example block diagram of the camera 304 is provided in FIG. 5.

Figure 4:
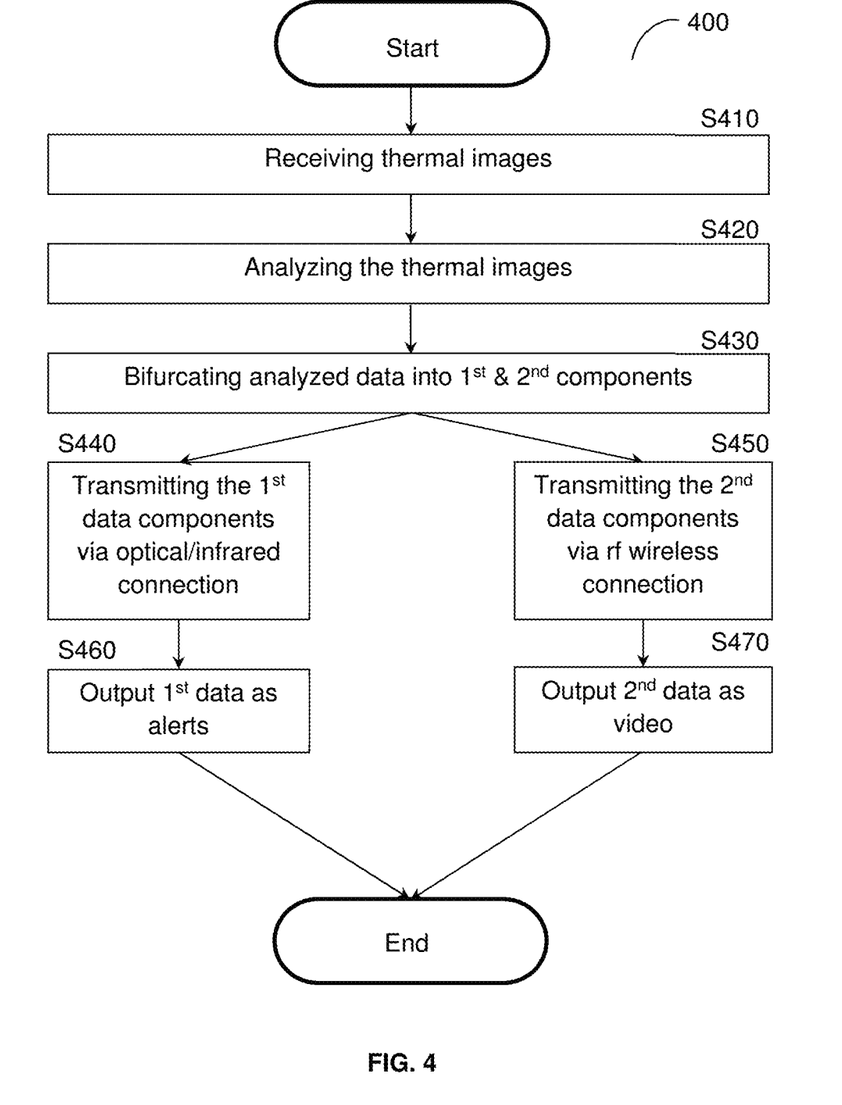
FIG. 4 is a flowchart of a method of processing sensor data captured by the ADAS mounting system, according to an embodiment.

FIG. 4 is an example flow chart of a method 400 of processing imaging data, according to an embodiment. At S410, image data captured by a camera is received. Then, at S420, the image data is analyzed to discern the content. Next, at S430, the analyzed data is bifurcated into safety-critical and safety-non critical data. That is, the analyzed data is bifurcated into first data components and second data components. As described previously with regards to FIG. 1, safety-critical data may include metadata associated with an image that may be used to provide audio or light alerts to an operator of a vehicle, such as oncoming obstacles including pedestrians, cyclists, or other vehicles. Safety-critical data may also include those used to provide ADAS commands to steer the user's vehicle, or safety functions, such as lane-keep assist, adaptive cruise control, determining proximity to oncoming obstacles, or determining current road conditions in accordance with weather or road surface. Non-critical information include those that do not affect the safety of ADAS vehicle operation, even when the network interface controller 116 fails to transmit the information (i.e., the information is lost or dropped during data transmission). In other words, the non-critical information include those that are merely used to display on a display 106 for a user to see, and does not include ADAS commands, alerts, or safety function. An example of such non-critical data is video data Afterwards, at S440 a first plurality of data formed from the first data components that is considered to be safety-critical data is transmitted via one of an optical or an infrared connection from a plurality of external components to a plurality of internal components. Next, at S450, a second plurality of data formed from the second data components is transmitted via a wireless connection from the plurality of external components to the plurality of internal components. Afterwards, at S460, the first plurality of data is outputted as alerts, and at S470, the second plurality of data is outputted as video.

Figure 5:
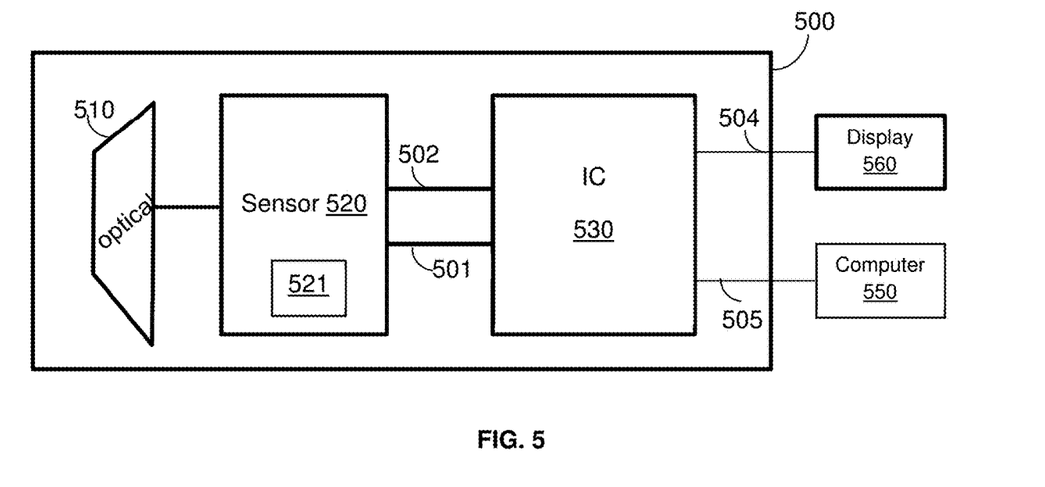
FIG. 5 is a block diagram of an infra-red camera utilized according to an embodiment.

FIG. 5 is an example block diagram of an LWIR camera 304 implemented according to an embodiment. The LWIR camera 100 includes an optical unit 510 and an LWIR sensor 520 coupled to an integrated circuit (IC) 530. The output of the LWIR camera 304 is a video stream of thermal images (thermal video stream) captured by the LWIR sensor 520 and processed by the IC 530.

In an embodiment, thermal video streams are output by the LWIR camera 304. A first stream 504 includes thermal images captured by the LWIR sensor 520 and processed by the IC 530 for the shutterless correction and image enhancement. In an example embodiment, the first thermal video stream 504 is an 8-bit grayscale video stream. The first thermal video stream 504 is fed to a display which may be a screen or a dashboard of a vehicle. In a further embodiment, multiple thermal video streams are output by the LWIR camera. The output streams may include results from images received from non-LWIR sensors, e.g., visible wavelength, CCD or CMOS sensors.

A second stream 505 includes thermal images captured by the LWIR sensor 520 and processed by the IC 530 for at least shutterless correction. In an example embodiment, the second thermal video stream 505 is a 14-bit data stream. The second stream 105 is fed to a computer 550 for computer vision processing. Specifically, the computer 550 may be configured to execute various computer vision algorithms related to AVS and other autonomous systems and applications. The algorithms may include, but are not limited to, detection of objects, obstacles, or hazards on a road. For example, the processed thermal video stream as output by the LWIR camera 304 can be utilized for the detection of vehicles, pedestrians, animals, two-wheelers, black-ice spots, litter, debris, potholes, gully covers, curbs and so on. In an embodiment, the computer 150 may be an onboard vehicle computer or a dedicated computer installed in the vehicle (not shown). In some example embodiments, the computer may be a virtual or physical computing machine operable in a cloud computing platform (not shown).

In an embodiment, only one thermal stream is generated and output. Further, as discussed above, the first and/or the second stream are wireless transmitted to the internal unit.

According to some embodiments, the processing performed by the IC 530 is configured to enhance the quality of the captured thermal images to allow for accurate and fast detection of objects, obstacles and hazards on the road. The processing by the IC 530 ensures passive detection of objects during day and night lighting conditions and at all weather conditions. To this end, the IC 530 is configured to perform one or more image processing tasks. Such tasks include, but are not limited to, shutterless correction, sunburn protection, bad pixel replacement, near field correction, temporal denoising, spatial denoising, edge enhancement, automatic gain control, local contrast, enhancement, and brightness and polarity adjustment. In an embodiment, these tasks are performed in a pipeline manner where some or all the tasks may be utilized to process a LWIR image (frame), thus ensuring low latency processing.

The IC 530 provides the shutterless correction of LWIR images captured by the LWIR sensor 520. As demonstrated in FIG. 1, the LWIR camera 304 does not include any shutter (or any moving part that can be viewed as shutter). The shutterless correction executed by the IC 530 allows the performance of a flat-field correction without any shutter. That is, shutterless correction allows for a uniform LWIR image.

It should be appreciated that the shutterless LWIR camera 304 is mechanically reliable and meets safety standards required for AVS systems. Further, not using a shutter allows designing an LWIR camera 304 with a small form factor as there is no need to include moving parts in the design. An example form factor of the LWIR camera 304 is shown in FIG. 5.

The optical unit 510 includes one or more lens elements, each of which having a predetermined field of view (FOV). In an embodiment, the lens elements are chalcogenide. The lens may be protected by a protective window (not show in FIG. 1). Further, to prevent icing of the optical unit 510, it may be covered by a heating means (not shown in FIG. 1). The heating means may include a wire or a coil.

In an embodiment, the LWIR camera 304 may include multiple optical units 510. Each optical unit 510 may be used independently or may be used in conjunction with one or more other optical units 510. For example, a single LWIR sensor 520 may be connected to two or more optical units 510. Further, in an embodiment, multiple LWIR sensors 520 may be connected to a single IC 530. The multiple optical units 510 and/or multiple LWIR sensors 520 may be used in tandem to capture and create a resulting image with a higher final resolution than a single optical unit 510 or LWIR sensor 520 may otherwise provide. As a non-limiting example, two VGA (640 pixels×480 pixels) sized LWIR sensors 520 may be used to capture a single 1280 pixels×480 pixels LWIR image.

The IC 530 may be configured to automatically stitch two adjacent images together and may apply all of the corrections discussed herein to the final composite image. Alternatively, each individual image may be first corrected, and then stitched together. In a further embodiment, the images are not stitched, but rather concatenated horizontally or vertically when output to a display or to a computer. The multiple optical units 510 or LWIR sensors 520 may be used for stereo vision applications, or to provide multiple view angles of a scene.

Multiple image streams are received and processed by the LWIR camera 304. Such embodiments may include creating an output stream that is a fusion of the multiple video streams, including different imaging modalities e.g., a fusion of LWIR images with a visible-spectrum image, a fusion of LWIR images having various focal lengths, and the like. Any number of input streams may be received and processed to produce the fused output stream.

The LWIR sensor 520 is an uncooled LWIR sensor. That is, the sensor 520 operates in the LWIR or FIR spectrum. In an example, the sensor 520 is coupled through a first bus 101 to the IC 530 to input the captured thermal images and metadata. In an embodiment, a junction temperature sensor (temp sensor) 121 is included in an enclosure of the sensor 520 to measure the junction temperature therein.

A control bus 502 is also connected between sensor 520 and the IC 530. On the bus 502, signals related to status of the sensor 520, clock, synchronization, and other digital control signals are transferred. In an embodiment, the bus 502 may carry analog signals indicating, for example, the current ambient temperature at the sensor 520. Alternatively, the analog signal may not be part of the control bus 502. The IC 530 includes a memory, a processing circuitry, and various circuits and modules allowing the execution of the tasks noted herein. The operation of the camera 304 is further disclosed in U.S. patent application Ser. No. 16/058,643 to KUYBEDA, et al and incorporated herein for that it contains.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for processing images, comprising:
   receiving thermal images captured by a camera included in an external component;
   analyzing the thermal images;
   bifurcating thermal images data that have been analyzed into first data components and second data components;
   transmitting a first plurality of data formed from the first data components via the external component to an internal component; and
   transmitting a second plurality of data formed from the second data components via the external component to the internal component, wherein the external component is mounted to the internal component through a windshield.

2. The method of claim 1, further comprising:
   outputting the first plurality of data optically as alerts; and
   outputting the second plurality of data wirelessly as video.

3. The method of claim 1, wherein the camera comprises an infrared camera.

4. The method of claim 1, wherein the first data components provide one of the alerts to a user of a vehicle, commands to steer the user's vehicle, or function to operate the user's vehicle.

5. The method of claim 2, wherein the alerts include one of an audio alert and a visual alert.

6. The method of claim 1, further comprising:
   receiving power, by a power receiver, by a power wireless transmitter that is configured to wirelessly be coupled with the power receiver.

7. The method of claim 1, further comprising:
   processing, by a microcontroller located within the plurality of internal components and coupled to a first receiver, the transmitted first plurality of data.

8. An imager mounting system, comprising:
   an external component comprising a thermal image capture sensor and a transmitter for transmitting thermal image information; and
   an internal component including a receiver configured to receive the thermal image information, wherein:
   the thermal image information is wirelessly transmitted by the external component;
   the external component is coupled to the internal component via a glass; and
   the internal component is further configured to wirelessly power the external component.

9. The system of claim 8, wherein the external component includes:
   a processing circuitry;
   an infrared camera that includes the image capture sensor, the infrared camera being protected by a protection window, wherein the infrared camera is configured to capture thermal images from which is developed the thermal image information that is received by the internal component;
   an optical transmitter configured to at least some of the thermal image information to the internal component;
   a network interface controller configured to transmit non-critical data; and
   a wireless power receiver configured to receive power from a wireless power transmitter located within the internal component, the received power being usable to power the external component.

10. The system of claim 9, wherein the infrared camera is a shutterless camera.

11. The system of claim 9, wherein the network interface controller is a wireless interface.

12. The system of claim 9, wherein the optical transmitter is configured to establish an infrared connection with the optical transmitter.

13. The system of claim 9, wherein the processing circuitry is configured to:
   analyze the captured thermal images; and
   bifurcate the analyzed thermal images data into first data components of the thermal image information and second data components of the thermal image information, wherein the first data components are transmitted through the optical transmitter and the second data components are transmitted through the network interface controller.

14. The system of claim 8, wherein the imager mounting system is configured for a vehicle having an Advanced Driver Assistance System (ADAS).

15. The system of claim 13, wherein the internal component includes:
   an optical receiver configured to receive the optically transmitted first data components of the thermal image information;
   a wireless power transmitter configured to transmit power to the external component to power the external component; and
   an alert device configured to provide alerts based on the received first data components of the thermal image information.

16. A system for processing images, comprising:
   a processing circuitry; and
   a memory, the memory containing instructions that, when executed by the processing circuitry, configure the system to:

receive thermal images captured by a camera included in an external component;

analyze the thermal images;

bifurcate the thermal images data that have been analyzed into first data components and second data components;

transmit a first plurality of data formed from the first data components via the external component to an internal component; and transmit a second plurality of data formed from the second data components via the external component to the internal component, wherein the external component is mounted to the internal component through a windshield.

17. The system of claim 16, wherein the camera comprises an Infrared camera.

18. The system of claim 16, wherein the system is further configured to:

output the first plurality of data optically as alerts; and output the second plurality of data wirelessly as video;

wherein the first data components provide one of alerts to a user of a vehicle, commands to steer the user's vehicle, or function to operate the user's vehicle.

19. The system of claim 16, wherein the external component further comprises a power receiver that receives power from a wireless power transmitter located within the internal component, the received power configured to power the external component.

20. The system of claim 16, further comprising a microcontroller located within the internal component and coupled to a first receiver, the microcontroller configured to process the transmitted first plurality of data.

\* \* \* \* \*